United States Patent Office 3,850,893
Patented Nov. 26, 1974

3,850,893
SECONDARY ACCELERATORS FOR VULCANIZATION OF RUBBER
Pyong-Nae Son, 2106 Ayers Ave., Akron, Ohio 44313
No Drawing. Filed Sept. 24, 1973, Ser. No. 400,341
Int. Cl. C08c 11/50; C08d 13/28; C08f 29/02
U.S. Cl. 260—80.78                               8 Claims

ABSTRACT OF THE DISCLOSURE

Tetraalkyl-2-acylguanidines serve as secondary accelerators in cure of natural and synthetic rubbers.

BACKGROUND OF THE INVENTION

Rubber compounders are constantly seeking fast curing compounds that also display scorch protection. Many compounds are known which have the property of accelerating the sulfur vulcanization of rubber. It is most desirable to have the process of vulcanization take place in the shortest period of time. The more active accelerators are generally active at low temperatures and often tend to cause prevulcanization or scorching during necessary processing steps performed prior to the vulcanization step in preparing rubber compounds.

An object of this invention is to provide a new class of secondary accelerators, which when combined with known primary accelerators, contributes to shorter overall cure time with improved physical properties such as high modulus and reduced hysteresis (heat rise), and prevents scorching of the stocks in prevulcanization processing.

The material, 1,1,3,3-tetramethylguanidine (TMG), is known as a fast curing accelerator for many rubber stocks. Moreover, when combined as a secondary accelerator in a rubber compound with tetramethylthiuram disulfide as the primary accelerator, TMG enhances cure rate about 40%. This is an unexpected result from the combination of the two known accelerators.

When TMG is combined as an accelerator with 2-(4-morpholinothio)benzothiazole (OBTS) as the primary accelerator, there is no similar improvement of cure. Negative results are also observed when the primary accelerator is 2-mercaptobenzothiazole (MBT).

This invention provides certain 2-acyl substituted tetraalkylguanidine compounds and the teaching that when they are combined with the accelerator OBTS and other thiazole type accelerators in cure of natural and synthetic rubbers, increased cure rates unexpectedly result. These new cure systems are also less scorching than known cure systems containing the commercially available 1,3-diphenylguanidine (DPG).

SUMMARY OF THE INVENTION

Tetraalkylguanidines, particularly 1,1,3,3-tetramethylguanidine, are susceptible to substitution in the 2 position by acyl groups, that is, in the basic guanidine structure

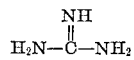

both hydrogen atoms on the amino (i.e. —NH$_2$) nitrogen atoms are replaced by alkyl groups and the hydrogen atom on the imine (i.e. =NH) atom is replaced by an acyl group. These 2-acyl substitute tetraalkylguanidines are represented by the formula

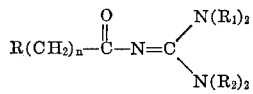

in which R represents an aromatic group of 6–10 carbon atoms or an alkyl group of 1–4 carbon atoms. When R is an aromatic group, said group may bear substitution such as chloro, bromo, iodo, hydroxy, methyl, methoxy or nitro in the o-, m-, or p-position. The terms R$_1$ and R$_2$ are alkyl groups of 1 to 5 carbon atoms. They may be the same or different, but, preferably both methyl.

The term $n$ is a number from 0 to 15. When $n$ is 0, R must be an aromatic group. The 2-acyl substituted guanidines of this invention are readily prepared by the reaction of acyl chlorides or alkanesulfonyl chlorides with tetraalkylguanidine in the presence of a tertiary amine catalyst such as triethylamine. Tetraalkylguanidines such as tetramethylguanidine are commercially available.

These 2-acyl substituted tetraalkylguanidine materials are highly desirable agents in sulfur vulcanization systems particularly when employed as activators for known accelerators such as thiazole accelerators, including mercapto-aryl thiazoles, benzothiazylthiobenzoate, dibenzothiazyl disulfide, benzothiazylsulfenamides and others.

Results show that mixtures of these secondary accelerators with primary accelerators give more balanced and desirable cure as well as improved physical properties than do the components of the mixtures when used separately.

The secondary acceleration effect of 2-acyl substituted tetraalkylguanidines with thiazole primary accelerators occurs in both natural rubber compounds and synthetic rubber compounds. Natural rubbers which can be used include natural, balata and gutta percha. Synthetic rubbery materials which can be used in the practice of this invention are polymeric diene rubbers such as polybutadiene - 1,3 polyisoprene, poly - 2,3 - dimethylbutadiene-1,3, poly - 2,3 - dimethylbutadiene - 1,3, poly - 2 - chlorobutadiene-1,3 and the like. Polymeric diene rubbers containing at least 50% by weight of the diene, and more preferably about 55 to 85% by weight of the diene, also may be used. Such polymers include isobutylene-isoprene copolymers, butadiene-styrene copolymers, butadiene-acrylonitrile copolymers, butadiene-vinyl pyridene copolymers, butadiene-acrylic acid copolymers, butadiene alkyl acrylate or methacrylate copolymers, butadiene-chlorostyrene copolymers, butadiene-methyl vinyl ketone copolymers, and the like. Copolymers, terpolymers and other multicomponent polymers containing as little as 35% by weight or less of the diene may also be employed. For example: polymers of about 35% by weight butadiene-1,3 and about 65% styrene and acrylonitrile; polymers of about 97% by weight isobutylene and about 3% isoprene; and polymers of about 70–50 mol percent ethylene, 35–50 percent propylene and 0.5–3 mol percent of a third monomer such as 1,4 - hexadiene, 2 - methyl - 1,4-hexadiene, dimethyl - 1,4,9 - decatriene, dicyclopentadiene, vinyl cyclohexene, vinyl norbornene, ethylidene norbornene, norbornadiene, methyl tetrahydroindene and the like, can be used.

For best results the secondary accelerators of this invention are employed in ranges of 0.1 to 3.0 parts, preferably 0.5–2.0 parts, by weight based on 100 parts of hydrocarbon and in conjunction with 0.5 to 3.0 parts by weight per 100 parts rubber of a primary accelerator.

In the study of this invention cure rates have been determined and compared by using a viscurometer, a machine known to those skilled in the art and described in an article, "The Viscurometer—An Instrument To Assess Processing Characteristics," Rubber Chemistry and Technology, vol. 37, No. 2, 1964 by A. E. Juve et al. The apparatus measures scorch times and time to optimum cure. It consists of a heated die chamber and a drive which rotates a biconical rotor through 2 oscillations per minute through a fixed arc of ±6°. Torque to imposes a strain ±6° is measured. A torque in inch pounds vs. time in minutes trace is recorded. In the data reported below the cure rates refer to the slope of the steepest tangential line that can be drawn to the viscurometer curve and are in units of in.-lb./min. The values recorded from the curve are: torque developed, Δ torque Δτ (Δ=maximum torque—minimum torque), in inch pounds; scorch time, $T_s$, the time in minutes for minimum torque to increase 2 units; cure time, $T_c$, the time in minutes to reach 90% of Δ torque; and overall cure rate, the slope of the steepest tangential line of the viscurometer cure in.-lb./min. In general, it is desirable that Δ torque or Δτ be high, $T_s$ be high, $T_c$ be low and cure rate be high.

DETAILED DESCRIPTION OF THE INVENTION

Preparation of 1,1,3,3-tetramethylguanidine derivitives
1,1,3,3-tetramethyl-2-benzoylguanidine Tetramethylguanidine (Eastman Kodak Co.), 57.6 g. (0.5 mole), and 50.6 g. (0.5 mole) triethylamine dissolved in 400 ml. tetrahydrofuran are placed in a dry 2-liter flask. The solution is cooled to 9° C. and 70.3 g. (0.5 mole) of benzoyl chloride in 200 ml. tetrahydrofuran is added dropwise. A white precipitate of triethylammonium chloride forms. Temperature is maintained at 9–18° C. The slurry is stirred two hours, then filtered. The precipitate is washed with tetrahydrofuran and the combined washings and filtrate are concentrated on a rotary evaporator to form a yellow syrup in the amount of 110 g. (86% of theory).

The yellow syrup analyzes as 1,1,3,3 - tetramethyl-2-benzoylguanidine by elemental analysis, infrared, mass spectroscopy and nuclear magnetic resonance (NMR).

*Analysis.*—Calculated for $C_{12}H_{17}N_3O$: C, 65.72; H, 7.82; N, 19.17. Found: C, 65.36; H, 7.77; N, 19.49.

Using the same procedure and varying the acyl chloride as shown in Table 1 below gives the substituted tetramethylguanidines listed in Table 1.

TABLE 1

| (Acyl) chloride | 1,1,3,3-tetramethylguanidine | Designation |
|---|---|---|
| Benzoyl chloride | 1,1,3,3-tetramethyl-2-benzoyl-guanidine. | A |
| Acetyl chloride | 1,1,3,3-tetramethyl-2-acetyl-guanidine. | B |
| p-Nitrobenzoyl chloride | 1,1,3,3-tetramethyl-2-(p-nitrobenzoyl)-guanidine. | C |
| p-Chlorobenzoyl chloride | 1,1,3,3-tetramethyl-2-(p-chlorobenzoyl)-guanidine. | D |

Two master batch stocks, one based on natural rubber, (E); the second on EPDM rubber, (F), are prepared to the following recipes:

Natural Rubber (E)

| Material: | Parts by weight |
|---|---|
| Rubber | 100 |
| Zinc oxide | 5 |
| Stearic acid | 3 |
| Carbon black | 50 |
| Sulfur | 2.5 |
| | 160.5 |

EPDM Rubber (F)

| Material: | Parts by weight |
|---|---|
| EPDM (solution polymerized, 65 mol percent ethylene, 1.5 mol percent 1,4-hexadiene, I.V.=2) | 100 |
| Zinc oxide | 5 |
| Stearic acid | 1 |
| Carbon black | 75 |
| Naphthenic process oil | 25 |
| Dipentamethylenethiuram hexasulfide | 0.8 |
| Sulfur | 1.5 |
| | 208.3 |

The activity of OBTS varies between batches; therefore, its use as a control is repeated in every test series that follows.

The following rubber compounds as shown in Table 2 are prepared by conventional milling techniques and cured at 284° F. The viscurometer data such as Δ torque, scorch time ($T_s$), cure time ($T_c$) and cure rate as shown in Table 3. Once optimum cure times are determined, the stocks are cured for this period at 284° F. and subjected to standard physical tests which are reported in Table 3.

TABLE 2

| Material | Compound | | | |
|---|---|---|---|---|
| | G | H | I | J |
| Master batch (E) | 160.5 | 160.5 | 160.5 | 160.5 |
| OBTS | 1.0 | 1.0 | 1.0 | 1.0 |
| 2-acyl substituted guanidine A | | 1.0 | 0.6 | |
| DPG | | | | 0.6 |

Note.—OBTS=2-(4-morpholinothio)benzothiazole; DPG=diphenylguanidine.

TABLE 3

| Compound | Viscurometer data (284° F.) | | | Cure rate (in.-lb./min.) | Cure time used, min. | 300% mod./, p.s.i. | Tensile, p.s.i. | Elong., percent | Hysteresis, ΔT, °F. |
|---|---|---|---|---|---|---|---|---|---|
| | Δτ (in.-lb.) | $T_s$ (min.) | $T_c$ (min.) | | | | | | |
| G | 142.0 | 10.3 | 26.6 | 20.0 | 29 | 2,610 | 4,200 | 460 | 22 |
| H | 152.0 | 7.1 | 19.0 | 31.4 | 21 | 3,100 | 4,320 | 430 | 22 |
| I | 147.0 | 8.7 | 22.0 | 25.7 | 24 | 3,000 | 4,240 | 440 | 23 |
| J | 150.0 | 6.4 | 18.9 | 30.7 | 21 | 2,820 | 4,190 | 450 | 28 |

When the 2-acyl substituted tetraalkylguanidine is employed as a secondary accelerator for OBTS, the runs with the combined accelerator (H, I), when compared to primary accelerator alone (G), show increased modulus and cure rate with shorter scorch time and, unlike DPG (J) the 1,1,3,3-tetramethyl-2-benzoylguanidine shows no detrimental effect on hysteresis.

The example is repeated using 2 - acetyl-1,1,3,3-tetramethylguanidine (B) and 2-(p-nitrobenzoyl)-1,1,3,3-tetramethylguanidine (C) as the secondary accelerator. Similar improved cure rates and properties are observed.

EXAMPLE 2

Stocks are prepared in the manner of Example 1 with compositions shown in Table 4 and test results thereon shown in Table 5.

TABLE 4

| Material | Compound | |
|---|---|---|
| | K | L |
| Master batch (E) | 160.5 | 160.5 |
| OBTS | 1.0 | 1.0 |
| 2-acyl substituted guanidine D | | 1.0 |

Note.—OBTS=2-(4-morpholinothio)benzothiazole.

TABLE 5

| Compound | Viscurometer data (284° F.) | | | Cure rate (in.-lb./min.) | Cure time used, min. | 300% mod./, p.s.i. | Tensile, p.s.i. | Elong., percent | Hysteresis, ΔT, °F. |
|---|---|---|---|---|---|---|---|---|---|
| | Δτ(in.-lb.) | $T_s$ (min.) | $T_c$ (min.) | | | | | | |
| K | 132.0 | 12.8 | 31.0 | 17.9 | 34 | 2,600 | 3,990 | 450 | 26 |
| L | 146.0 | 9.8 | 21.6 | 31.1 | 24 | 2,940 | 3,880 | 390 | 24 |

The data show that use of the 2-acyl substituted tetraalkylguanidine as secondary accelerator contributes to lower scorch time, lower cure time, higher modulus and increased cure rate.

EXAMPLE 3

Stocks are prepared in the manner of Example 1 with compositions shown in Table 6 and test results shown in Table 7. Cures are at 320° F.

TABLE 6

| Material | Compound M | Compound N |
|---|---|---|
| Master batch (F) | 208.3 | 208.3 |
| TMTD | 0.8 | 0.8 |
| MBT | 1.5 | 1.5 |
| 2-acyl substituted guanidine A | | 1.5 |

NOTE.—TMTD=tetramethylthiuram disulfide; MBT=mercaptobenzothiazole.

TABLE 7

| Compound | Viscurometer data (320° F.) | | | Cure time, min. | 300% mod., p.s.i. | Tensile, p.s.i. | Elong., percent | Hysteresis, ΔT, ° F |
|---|---|---|---|---|---|---|---|---|
| | ΔT (in.-lb⁹) | $T_s$ (min.) | $T_c$ (min.) | | | | | |
| M | 76.0 | 4.9 | 19.4 | 24 | 1,890 | 2,225 | 370 | 54 |
| N | 83.0 | 4.6 | 15.9 | 21 | 1,730 | 2,380 | 440 | 50 |

Again the data show that 2-acyl substituted tetraalkyl guanidine, employed as secondary accelerator, contributes to shorter cure time as compared to results with primary accelerator alone.

What is claimed is:

1. A sulfur vulcanizable rubber compound containing in the accelerator portion of the compound a mixture of a primary accelerator and a secondary accelerator, said secondary accelerator comprising a 2-acyl substituted tetraalkylguanidine.

2. A sulfur vulcanizable rubber compound containing in the accelerator portion of the compound a mixture of a primary accelerator and a secondary accelerator, said secondary accelerator comprising a 2-acyl substituted tetraalkylguanidine wherein said guanidine is selected from the group of the formula

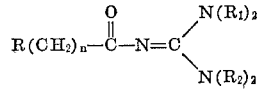

in which R represents an aromatic group of 6–10 carbon atoms or an alkyl group of 1–14 carbon atoms and where R is an aromatic group, said group may bear substitution in the o-, m-, or p- position selected from the class consisting of chloro, nitro, bromo, iodo, hydroxyl, methyl and methoxy groups, and the terms $R_1$ and $R_2$ are alkyl groups of 1 to 5 carbon atoms and $R_1$ and $R_2$ may be the same or different and $n$ is a number from 0 to 15, but when $n$ is O, R must be an aromatic group.

3. The compound of claim 1 wherein said rubber is natural rubber.

4. The compound of claim 1 where said rubber is EPDM.

5. The compound of claim 2 wherein said guanidine is 2-benzoyl-1,1,3,3-tetramethylguanidine.

6. The compound of claim 2 wherein said guanidine is 2-acetyl-1,1,3,3-tetramethylguanidine.

7. The compound of claim 2 wherein said guanidine is 2-(p-nitrobenzoyl)-1,1,3,3-tetramethylkuanidine.

8. The compound of claim 2 wherein said guanidine is 2-(p-chlorobenzoyl)-1,1,3,3-tetramethylguanidine.

References Cited

W. Hofmann, "Vulcanization and Vulcanizing Agents," 1967 (Palmerton), pp. 180–182.

HARRY WONG, JR., Primary Examiner

A. L. CLINGMAN, Assistant Examiner

U.S. Cl. X.R.

252—426; 260—42.33, 42.38, 63 BB, 79.5, 80.7, 80.78, 821, 83.3, 83.5, 85.4, 85.3, 92.3, 94.7, 789